(12) United States Patent
DeBrouse

(10) Patent No.: US 8,481,168 B2
(45) Date of Patent: Jul. 9, 2013

(54) ALGINATE-BASED BUILDING MATERIALS

(75) Inventor: Daniel R. DeBrouse, Meeker, OK (US)

(73) Assignee: Tamarisk Technologies, L.L.C., Meeker, OK (US)

( * ) Notice: Subject to any disclaimer, the term of this patent is extended or adjusted under 35 U.S.C. 154(b) by 0 days.

(21) Appl. No.: 13/553,449

(22) Filed: Jul. 19, 2012

(65) Prior Publication Data

US 2012/0279418 A1     Nov. 8, 2012

Related U.S. Application Data

(63) Continuation of application No. 13/281,821, filed on Oct. 26, 2011, now Pat. No. 8,246,733, which is a continuation of application No. 12/783,712, filed on May 20, 2010, now abandoned.

(60) Provisional application No. 61/180,280, filed on May 21, 2009.

(51) Int. Cl.
| | |
|---|---|
| *B32B 21/04* | (2006.01) |
| *B32B 21/14* | (2006.01) |
| *B32B 23/14* | (2006.01) |
| *B32B 13/00* | (2006.01) |
| *B29C 43/00* | (2006.01) |
| *B29C 65/00* | (2006.01) |
| *C09K 21/00* | (2006.01) |
| *C09K 21/06* | (2006.01) |

(52) U.S. Cl.
USPC ............... 428/537.1; 106/15.05; 106/18.11; 106/162.9; 106/164.4; 106/729; 106/804; 156/242; 156/307.1; 156/308.2; 162/100; 162/159; 162/176; 252/601; 252/607; 264/299; 264/319; 264/320; 424/195.17; 428/688; 428/703; 428/920; 428/921

(58) Field of Classification Search
USPC .............. 106/15.05, 18.11, 205.01, 729, 804, 106/162.9, 164.4; 252/601, 607; 424/195.17; 428/537.1, 688, 703, 920, 921; 156/242, 156/307.1, 308.2; 162/100, 159, 176; 264/299, 264/319, 320
See application file for complete search history.

(56) References Cited

U.S. PATENT DOCUMENTS

| | | | | |
|---|---|---|---|---|
| 2,720,469 | A | * | 10/1955 | Serkin ........................ 427/343 |
| 4,792,357 | A | * | 12/1988 | Bier ............................ 106/600 |
| 8,246,733 | B2 | * | 8/2012 | DeBrouse .................. 106/18.11 |

* cited by examiner

*Primary Examiner* — Anthony J Green
(74) *Attorney, Agent, or Firm* — Hovey Williams LLP

(57) ABSTRACT

The present disclosure describes various building materials used in the building and construction industry, and to buildings or objects constructed therefrom, and to methods of making these building materials. The building materials comprise a polymeric material, such as sodium alginate and/or calcium alginate which confers significant flame-, fire- and heat-resistance or imperviousness to the materials. Other substances can be added to the materials to improve cross-linking and/or to produce resistance to fungal degradation. The building materials which can be produced, processed, or treated using the alginate polymers of the invention include, but are not limited to, wood products; masonry products; wall, roofing, flooring and siding products; and paint products. Further, sodium alginate in the form of a gel may be used as a firebreak to effectively stop the advance of grass fires, wildfires, and forest fires.

10 Claims, 3 Drawing Sheets

ALGINATE-BASED BUILDING MATERIALS

CROSS-REFERENCE TO RELATED APPLICATIONS

The present application is a continuation of U.S. application Ser. No. 13/281,821, filed Oct. 26, 2011, which issued on Aug. 21, 2012 as U.S. Pat. No. 8,246,733, and which is a continuation of U.S. application Ser. No. 12/783,712, filed May 20, 2010, and now abandoned which claims the benefit under 35 U.S.C 119(e) of U.S. Provisional Application Ser. No. 61/180,280 filed May 21, 2009, the disclosures of which are hereby expressly incorporated herein by reference in their entireties.

STATEMENT REGARDING FEDERALLY SPONSORED RESEARCH OR DEVELOPMENT

Not applicable

BACKGROUND

Wildfires are inevitable. They occur on a nationwide scale, with their annual devastation easily seen upon a review of California's wildfire season. Consider the Cedar Fire in San Diego County which occurred in October and November of 2003. That horrific fire killed 15 people, including one firefighter and burned more than 280,000 acres destroying 2,232 homes and 22 commercial buildings. This was just one of several devastating blazes that were part of the worst wildfire siege, for structure loss, ever to hit the state. Further, the California Department of Insurance announced that in just one month in 2007, 37,117 claims had been filed, 1,531 of those being total losses, with over $2.26 billion paid out by insurers. All of this resulted from wildfire outbreaks in Southern California in the month of October.

California's Governor Schwarzenegger's climate advisors estimate that global warming could translate wildfire property losses to as much as $42 billion a year by 2050. That figure will skyrocket to perhaps as much as $60 billion when one adds state firefighting costs.

In addition to domestic and commercial property losses, the state of California currently loses federally owned forests at a rate of more than 30,700 acres per year due to wildfires. That's equivalent to losing a forest slightly larger than a city the size of San Francisco. If this rate continues over the next 100 years, 3 million acres of forestland could be lost, being converted into brush wastelands.

Although the annual loss of land, homes and commercial buildings in the state of California is alarming, this doesn't even begin to take into account property losses on a national scale due to wildfires. If we conducted a state to state evaluation and summed the total property and financial loss attributed to wildfires, the figures would be devastating. Furthermore, if the annual property loss and financial responsibility on a national scale due to domestic and commercial structure fires were included with those resulting from wildfires the financial impact would be unimaginable, not to mention the lives lost and those financial and mental burdens left upon our nation's families.

As God-fearing scientists and responsible citizens of this world, we must not turn a blind eye to the horrific loss of life and property resulting from fires. But rather we must ask ourselves "what can I do to help solve the problem?" The presently claimed and disclosed inventive concept(s) is (are) directed to such solutions.

SUMMARY OF THE DISCLOSURE

The present disclosure describes various building materials used in the building and construction industry, and to buildings or objects constructed therefrom, and to methods of making these building materials. The building materials which can be produced, processed, or treated using the alginate polymers of the presently claimed and disclosed inventive concepts include, but are not limited to, wood products; masonry products; wall, roofing, flooring and siding products; and paint products. Further, sodium alginate in the form of a gel may be used as a firebreak to effectively stop the advance of grass fires, wildfires, and forest fires.

More particularly, the various building materials disclosed herein possess a polymeric material component which confers significant flame-, fire- and heat-resistance or imperviousness to the materials. In particular, in preferred embodiments, the polymer component comprises sodium alginate which is combined with a building or construction material matrix. The sodium alginate is converted into calcium alginate by exposure to a calcium solution or by exposure to calcium inherent in the material matrix to which the sodium alginate is added. Alternatively, the alginate polymer component may comprise a form of alginate which is provided in a pre-existing calcium alginate form. Other substances can be added to the materials to improve cross-linking and/or to produce resistance to fungal degradation.

The building materials which can be produced, processed, or treated using the alginate polymers of the presently claimed and disclosed inventive concepts include, but are not limited to, wood products including, but not limited to, pressed boards containing saw dust, wood dust, stranded wood and/or wood chips, plywoods constructed from such pressed boards, lumber, boards, beams, trusses, studs, and other forms of cut or sawn woods, laminates, and other cellulosic materials (e.g., bamboo, cork, and other woody materials); masonry products including, but not limited to, concrete, cement, grout and mortar, concrete blocks of all types, masonry pigments, concrete for slabs, walls, footings, and roadways, concrete precasts of all types, architectural precast sills, copings, features, medallions and caps, architectural cast stones and simulated stone, plasters of all kinds, stuccos of all kinds, bricks of all types, concrete or clay roof units, all masonry or concrete based products; wall and roofing materials including, but not limited to, asphalt shingles, wood shingles, composite shingles, and synthetic shingles, gypsum and all gypsum based products, drywall, siding matrixes of all kinds, fiberglass and fiberglass based products; flooring materials including, but not limited to, vinyls, carpets, wood, wood laminates, stone, synthetic stone tiles, concrete, and concrete or cement-based flooring materials; electrical materials including, but not limited to, electrical devices, wire coatings and switches; insulating materials such as, but not limited to, fiberglass batting of all types; countertop materials including, but not limited to, formicas, composites, stone, synthetic stone, crushed stone or minerals, or concrete; plumbing materials including, but not limited to, flex pipe and pipe insulators; paints materials including, but not limited to, paints, paint pigments, and paint compounds; and glass, plastics, and rubber materials. Further, sodium alginate in the form of a gel may be used as a firebreak to effectively stop the advance of grass fires, wildfires, and forest fires. Other uses of the presently claimed and disclosed inventive concepts will become apparent upon review of the description provided below.

DETAILED DESCRIPTION

Figure 1:
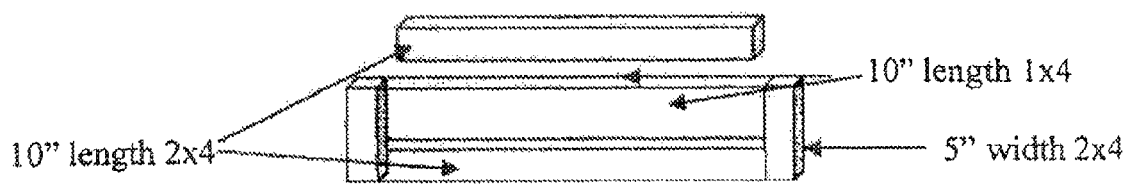
FIG. 1 is a schematic drawing of a mold used to press wood particles into a form.

The present disclosure describes various building materials used in the building and construction industry, and to buildings or objects constructed therefrom, and to methods of making these building materials. The building materials comprise a polymeric material, such as sodium alginate and/or calcium alginate which confers significant flame-, fire- and heat-resistance or imperviousness to the materials. Other substances can be added to the materials to improve cross-linking and/or to produce resistance to fungal degradation. The building materials which can be produced, processed, or treated using the alginate polymers of the invention include, but are not limited to, wood products; masonry products; wall, roofing, flooring and siding products; and paint products. Further, sodium alginate in the form of a gel may be used as a firebreak to effectively stop the advance of grass fires, wildfires, and forest fires.

Specific embodiments and examples of the present disclosure will now be described. Examples of specific implementations and compositions are provided herein for illustrative purposes only and are not intended to be limiting. In particular, acts, elements and features discussed in connection with one embodiment are not intended to be excluded from a similar role in other embodiments. In the following detailed description, numerous specific details are set forth in order to provide a more thorough understanding of the disclosure. However, it will be apparent to a person having ordinary skill in the art that the present disclosure may be practiced without these specific details. In other instances, features, methods, and other procedures which are well known to persons of ordinary skill in the art have not been described in detail to avoid complicating unnecessarily the description. Also, the phraseology and terminology used herein is for the purpose of description and should not be regarded as limiting. The use of "including," "comprising," "having," "containing," "involving," and variations thereof herein, is meant to be broad and to encompass the items listed thereafter and equivalents thereof as well as additional subject matter not recited. Further, in this specification and in any claims appended hereto, the singular forms "a," "an," and "the" include plural reference unless the context clearly dictates otherwise. Unless defined otherwise, all technical and scientific terms used herein have the same meaning as commonly understood to one of ordinary skill in the art to which the presently claimed and disclosed inventive concepts belong.

The presently claimed and disclosed inventive concepts, in various preferred but non-limiting embodiments, are directed to various building materials used in the construction industry, to objects constructed from the objects, and to methods of making these building materials. The building materials comprise a polymeric material which confers significant flame-, fire- and heat-resistance or imperviousness to the materials. In particular, in preferred embodiments, sodium alginate is combined with a material matrix used in the building or construction industry and is converted into calcium alginate by exposure to a calcium solution (e.g., any solution up to and including a saturated solution) or to calcium inherent in the material to which the sodium alginate is added. Alternatively, calcium alginate, as the alginate polymer component, may be directly combined with the construction material matrix. Other substances can be added to the matrix-polymer mixture to produce resistance to mold or fungal degradation.

The building materials which can be produced, processed, or treated using the alginate polymers of the presently claimed and disclosed inventive concepts include, but are not limited to, wood products including, but not limited to, pressed boards containing saw dust, wood dust, stranded wood and/or wood chips, plywoods constructed from such pressed boards, lumber, boards, beams, trusses, studs, and other forms of cut or sawn woods, laminates, and other cellulosic materials (e.g., bamboo, cork, and other woody materials); masonry products including, but not limited to, concrete, cement, grout and mortar, concrete blocks of all types, masonry pigments, concrete for slabs, walls, footings, and roadways, concrete precasts of all types, architectural precast sills, copings, features, medallions and caps, architectural cast stones and simulated stone, plasters of all kinds, stuccos of all kinds, bricks of all types, concrete or clay roof units, all masonry or concrete based products; wall and roofing materials including, but not limited to, asphalt shingles, wood shingles, composite shingles, and synthetic shingles, gypsum and all gypsum based products, drywall, siding matrixes of all kinds, fiberglass and fiberglass based products; flooring materials including, but not limited to, vinyls, carpets, wood, wood laminates, stone, synthetic stone tiles, concrete, and concrete or cement-based flooring materials; electrical materials including, but not limited to, electrical devices, wire coatings and switches; insulating materials such as, but not limited to, fiberglass batting of all types; countertop materials including, but not limited to, formicas, composites, stone, synthetic stone, crushed stone or minerals, or concrete; plumbing materials including, but not limited to, flex pipe and pipe insulators; paints materials including, but not limited to, paints, paint pigments, and paint compounds; and glass, plastics, and rubber materials. Further, sodium alginate in the form of a gel may be used as a firebreak to effectively stop the advance of grass fires, wildfires, and forest fires. Other uses of the presently claimed and disclosed inventive concepts will become apparent upon review of the description of the invention below. Sodium alginate is a material which is extracted from the cell walls of various types of brown algae and is widely used within the food industry as an emulsifying agent. This natural polymer has an unusual ability to form gels upon agitation within water which do not solidify upon standing. Furthermore, the gels thus formed present high non-specific encapsulation affinities. In other words, without wishing to be bound by theory, it is believed that the alginate macromolecule, through attractive atomic charges within the molecular backbone, has the ability to surround and wind itself around other molecules. The list of classes of molecules which may be effectively encapsulated within the alginate backbone is extensive.

Another unique characteristic of sodium alginate is its ability to react with calcium through ionic exchange to generate a non-water soluble form of the alginate polymer, calcium alginate. Calcium alginate is a solid polymer which is neither hydrophilic nor lipophilic. In fact it is completely resistant to water, moisture and organic solvent dissolution. After many years of research we have found it can only be digested enzymatically. Both soil fungi and mammals possess the natural enzymes necessary to digest the calcium alginate backbone. But more interesting than this is the alginate polymer's resistance to both heat and flame. Even under raging flames with temperatures in excess of 1000° C. the polymer will not melt nor catch fire. The alginate polymer has the molecular ability to refract or reflect both heat and flames which can easily be seen upon applying the flame of a torch to the surface of a piece of the alginate polymer. Where used herein, the term "alginate polymer" refers to either or both of sodium alginate and calcium alginate.

Although sodium alginate itself has a very effective molecular encapsulation activity, an even higher encapsulation affinity can be obtained from a polymeric component which comprises, in addition to the sodium alginate, an additional polymeric agent such as a cross-linking agent such as, but not limited to, a carrageenan, a xanthan gum, and/or an agar in an approximate ratio of 0.1-5.0% to 95.0%-99.9% of the sodium alginate. In this way a three-dimensional network builds up in which double helices form junction points of the polymer chains thus allowing for the formation of multiple helix-helix aggregates winding around the molecular compound of choice (e.g., see FIG. 4 described below). The polymeric component thus may comprise at least one of a group of agents including, cross-linking agents, comprising cellulose gums, pectins, pectin resins, locust bean gums, locust bean resins, xanthan gums, xanthan gum resins, carrageenans, sodium salts of carrageenans, gellan gums, gellan gum resins, whey protein gums, whey protein resins, agar agar, propylene glycol, Arabic gums, Arabic gum resins, guar gum, guar gum resins, gum tragacanth, and gum ghatti.

Figure 4:
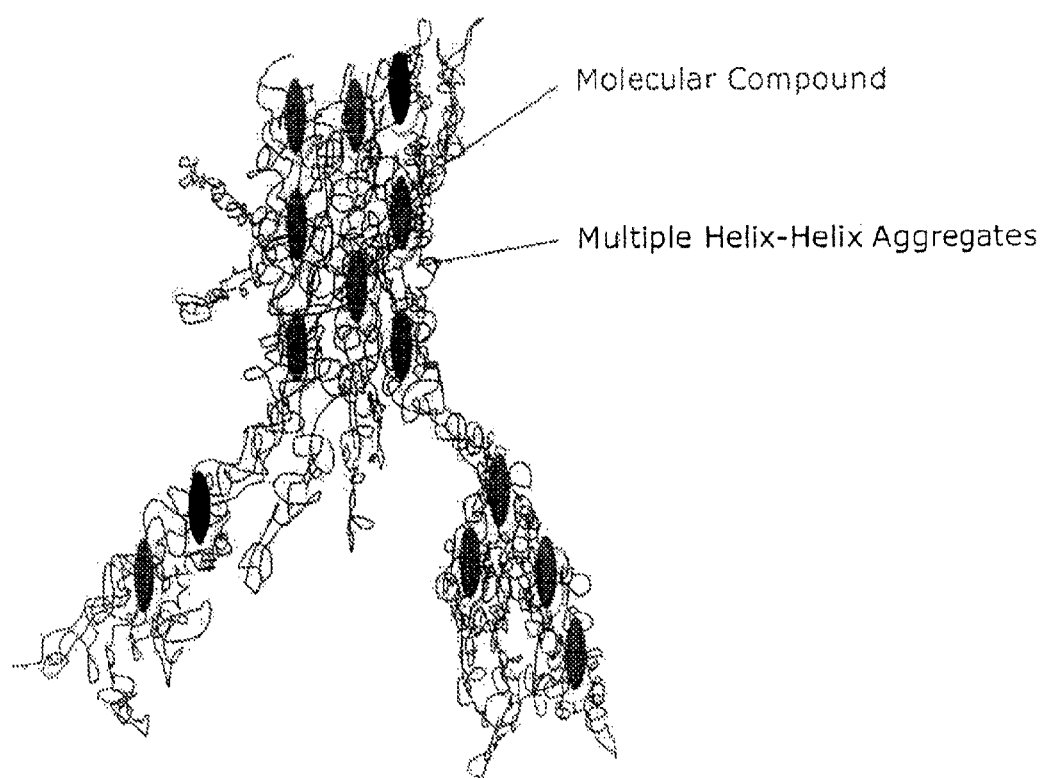
FIG. 4 is a schematic drawing of multiple helix-helix alginate polymer aggregates encapsulated about a molecular particulate material.
Figure 5:
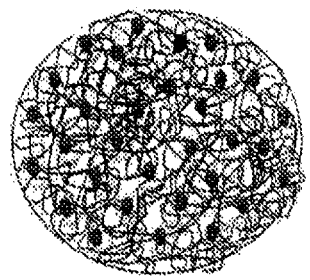
FIG. 5 is a schematic drawing of a primary calcium alginate macro-encapsulate comprising multiple helix-helix aggregates of FIG. 4.

The helix-helix alginate aggregates thus formed, although very effective in their ability to fully encapsulate and protect a molecular compound, are not yet capable of providing the optimal characteristics of flexibility, bond strength, moisture and mold resistance. This is due to the fact that in the gel state, as represented in FIG. 4 below, the polymer-compound conjugate is in a form which is water susceptible. The helix-helix aggregates, securely holding compound particulate, must next be converted to a water-resistant state. This is done through ionic exchange. For example, upon simple exposure of the aggregates within a 5% to 30% aqueous solution (more preferably 20-25% or any saturated solution of calcium chloride or a calcium halide), of calcium chloride, the sodium of the aggregates is replaced by calcium. This reaction occurs rapidly at room temperature or below resulting in the formation of helix-helix loaded aggregates which rapidly separate from the aqueous medium in the form of a solid pre-set matrix. Upon drying of the aggregate matrix to a water content of <5%, preferably to <1%, or to anhydrous state, a matrix is provided which is 100% resistant to moisture and mold with superior bond strength, heat resistance, flame retardance, effervescence, unlimited shelf homogenicity with a high degree of flexibility in addition to all those properties discussed in the preceding sections. In addition to converting loaded aggregates to their water resistant form, calcium plays another key role in the molecular configuration of an alginate encapsulated matrix: it cross-links neighboring polymers. Through calcium cross-linking the stability of our end matrix is set in a three dimensional spherical configuration (e.g., see FIG. 5 described below) which serves not only to hold an encapsulated compound more securely but in the protection of the material from oxidative degradation, UV degradation, and moisture degradation in addition to a vast number of other environmental stresses.

The following work demonstrates how sodium alginate and/or calcium alginate can be incorporated into a construction material matrix for the production of commercial and domestic building materials which are flame retardant, heat resistant, moisture resistant, and mold resistant. The kinds of construction material matrixes within which or onto which the alginate polymer may be incorporated is virtually unlimited For example, the polymer may be combined with a matrix comprising saw dust, stranded wood and/or wood chips to form heat, flame and moisture resistant pressed boards. Or, a matrix comprising wood lumber may be treated with polymer. The polymer, for example, may be added to a matrix comprising cement, concrete, paint, drywall, shingles, roofing, siding, flooring, glass and masonry products to list but a few of the materials described in more detail elsewhere herein. In addition, it is demonstrated herein how sodium alginate gel may be used as a fire-break to affectively stop or inhibit wildfires.

EXAMPLES

Example 1

Wood Products

A: Pressed Boards

Procedure: Optimization of Flame Retardant Polymer Formulation

The optimal level of dry polymer to wood dust, wood strands or chips in order to produce the most heat, flame and moisture resistant board was determined. Thus pressed boards were prepared in triplicate using the polymer formulas provided in Table 1 according to the following procedure.

In a 5 gallon bucket, 500 ml of wet alginate polymer formula were mixed with 0.1 Kg of a construction material matrix comprising wood dust, strands and/or wood chips. This mixture was homogenized for a period of 60 seconds and then pressed into a board using the mold-press of FIG. 1. Prior to adding the alginate polymer/wood mix to the mold, the mold was sprayed with 23% aqueous calcium chloride solution. Once the mix was loaded, an additional 300 ml of calcium chloride solution was poured evenly over the surface of the mix. Using a 2×4 board, a 1×4 board and wood screws a wood-molding press was constructed as shown in FIG. 1. This mold was used to press a mixture of the polymer and the matrix comprising saw dust, stranded wood and wood chips to form pressed boards. The mold was filled with the polymer-wood mix and pressed using an industrial bench vice. Once pressed, the board was removed from the mold and dried overnight at 100° C. The pressed board end product had the following dimensions: 3½"×9½"⅞" thickness. Boards of each formula were prepared in triplicate.

Upon completion of the drying process pressed boards produced using each formula were exposed to a flame of a propane torch (the flame had a distance of 0.25 inch from the board for testing) and evaluated for heat and flame resistance. Results are shown in Table 2.

TABLE 1

Optimization of formula: ratio of polymer to wood.

| Formula No. | Sodium Alginate | Water | CaCl Solution |
|---|---|---|---|
| 3 | 1.5% | 0.90 g | 60 ml | 23 g CaCl/100 ml |
| 4 | 2.5% | 1.50 g | 60 ml | 23 g CaCl/100 ml |
| 5 | 2.64% | 4.75 g | 180 ml | 23 g CaCl/100 ml |
| 6 | 5.7% | 14.25 g | 250 ml | 23 g CaCl/100 ml |

TABLE 2

Resistance testing in triplicate. A pre-test temperature was taken on each board and recorded to be 61° F.

| Distance Flame from the Surface | Pressed Wood Formula No. | Surface Temperature* | Internal Temperature of the Wood | Time Exposed to Flame | Result of Heat and Fame Test |
|---|---|---|---|---|---|
| ¼" | 3 | >1000° C. | 86° F. | 10 min | 100% Resistant |
| ¼" | 4 | >1000° C. | 62° F. | 10 min | 100% Resistant |
| ¼" | 5 | >1000° C. | 62° F. | 10 min | 100% Resistant |
| ¼" | 6 | >1000° C. | 61° F. | 10 min | 100% Resistant |

*Surface temperatures were taken using an infrared thermometer.

Assays of polymer:wood ratios indicated in a preferred (non-limiting) embodiment that the optimal level of dry polymer to wood dust, strands or chips (taking overall cost into consideration) is 8.47% alginate polymer to 91.53% wood (referred to elsewhere herein as Formula No. 4). Formula No. 4 is made on an upscale by homogenizing 252 g of sodium alginate in 10 L of cold water until a homogeneous gel is obtained. In preferred embodiments, the percentage-by-weight of the polymer component in a polymer/wood mixture (or any of the construction material matrixes of the presently claimed and disclosed inventive concepts) ranges from 1% to 2% to 3% to 4% to 5%, to 10% to 15% to 20% to 25% to 30% to 40% to 50% to 60% to 70% to 80% to 90% to 95% of the polymer/matrix mixture. Although each formula tested was resistant to both flame and heat, the optimum was chosen through an evaluation of flame penetration into the wood matrix. For example, pressed boards prepared from the polymer-wood mix will not "catch fire". However, when the flame of a torch is held to the surface of the prepared board for prolonged periods, the flame will slowly penetrate the surface of the pressed board boring a small hole approximately ¼" in diameter at varying depths depending upon the concentration of alginate polymer added. Formula No. 4 provided the least amount of flame penetration and thus was judged as most optimal. It should be noted that higher concentrations of polymer in the mixture provide an end matrix exhibiting even less flame penetration, however, in choosing the most optimal formula cost was also taken into account. In fact a blank, or simulated wood, made of 100% alginate polymer is not only 100% heat and flame resistant but 100% resistant to flame penetration as well. However, at the present time the cost of producing such simulated wood from alginate polymer is too expensive for widespread use. As the fermentation, extraction and purification costs of alginate polymer from algae are decreased through process optimization, alginate simulated wood will become a commercial (marketable) reality and its use widespread in both commercial and domestic structure construction.

Figure 2:
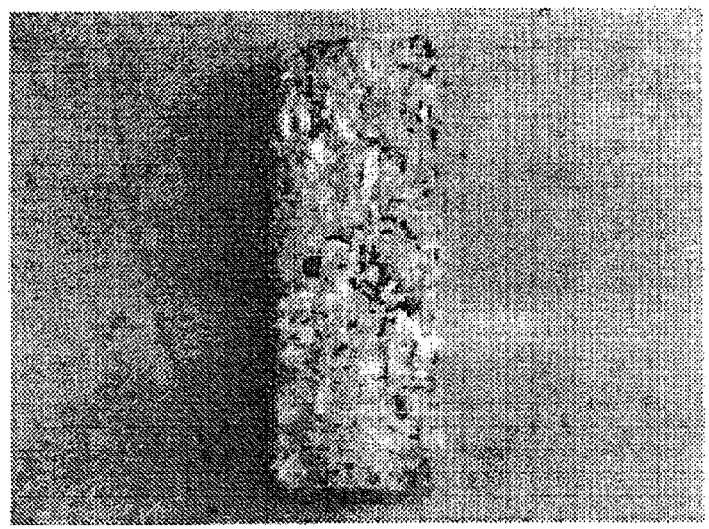
FIG. 2 is a photograph of a board constructed in accordance with the presently claimed and disclosed inventive concepts.
Figure 3:
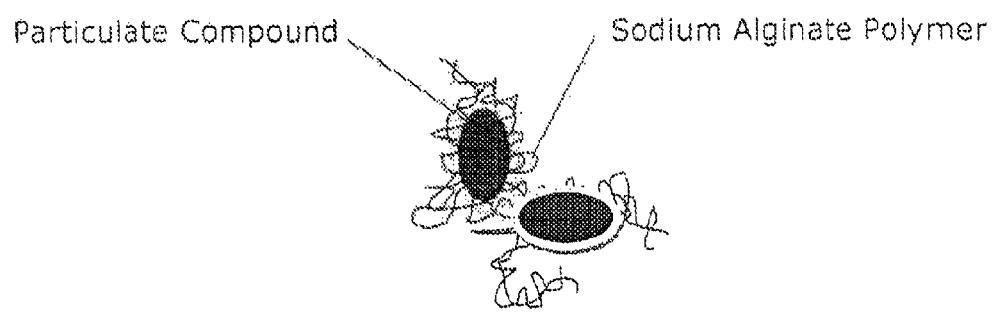
FIG. 3 is a schematic drawing of sodium alginate polymer gel encapsulating a particulate material.

FIG. 2 provides a photograph of a typical alginate macroencapsulated pressed board as prepared by the procedure outlined above. The physical appearance of the prepared pressed board does not vary significantly from that of traditional pressed woods. However, the physical and chemical properties of alginate pressed boards are far superior to those of traditional pressed matrixes.

First the alginate pressed boards were fire resistant. All attempts at initiating burning of the final wood product failed even after several hours of direct exposure of the matrix to the flame of a propane torch and to temperatures well in excess of 1000° C. In fact, as noted above, when the flame of a torch was held at a distance of ¼" from the surface of the wood the only visible effect was formation in the board of a very small diameter hole with some blackening of a ¼" diameter region where the flame was in direct contact with the surface for several minutes to hours. Once the flame was removed not even the slightest hint of ember glow was seen. In fact one could immediately touch the heated surface finding it just slightly elevated above room temperature, still relatively cool to the touch.

Second, alginate pressed boards exhibited equal to greater strength than that of traditional pressed boards with only a fraction of the end matrix weight. For example, a 2½" length of a 2"×4" piece of alginate pressed wood weighs only 11.74 g in comparison to the 23.37 g weight of the same length, width and thickness of a traditional pressed board.

Third, alginate pressed boards acted as an insulator. For example, when the flame of a propane torch was held at a distance of ¼" from the surface of the pressed board for several minutes to hours the internal temperature of the pressed board never rises above 62° F. Considering that the initial 0 hour internal temperature, the temperature prior to heating, was 61° F., the alginate pressed board had significant insulating properties and was thus resistant to the transfer of heat.

Fourth, an alginate pressed board may include an all-natural citrus extract, such as CitroBio™ or other anti-fungal composition, making it resistant to mold contamination. For example, a concentration of just 160 ppm, on a dry weight basis, of citrus extract inhibited mold growth. With mold resistance incorporated directly into the board matrix, a lifetime resistance is established.

Fifth, alginate pressed boards were moisture resistant. The three-dimensional molecular matrix which was established between the alginate polymer and the wood dust, strands or chips through calcium cross-linking, established a molecular encapsulate which actually repels water. This also is a lifetime trait of the board.

Sixth, whereas bonding agents are currently required in the production of pressed board, in alginate pressed board no external bonding agents was required. The alginate/calcium encapsulated molecular matrix was more than sufficient for board bonding with an affinity many times that of traditional adhesives or bonding agents, processes and practices.

B: Treated Lumber

Conventional wood lumber was provided as the matrix material and was submerged in a tank of sodium alginate polymer (Formula No. 4) for a period of 24 hours under vacuum then was treated with $CaCl_2$ solution under vacuum.

In initial tests, "2×4" and "1×4" boards were treated in triplicate and heat and flame resistant testing was conducted. Results are shown in Table 3.

TABLE 3

Boards were treated with Formula No. 4. Resistance testing in triplicate.

| Distance Flame from the Surface | Treated Wood-Size | Surface Temperature* | Internal Temperature of the Wood | Time Exposed to Flame | Result of Heat and Flame Test |
|---|---|---|---|---|---|
| ¼" | 2 × 4 | >1000° C. | 62° F. | 10 min | 100% Resistant |
| ¼" | 2 × 4 | >1000° C. | 62° F. | 10 min | 100% Resistant |
| ¼" | 2 × 4 | >1000° C. | 62° F. | 10 min | 100% Resistant |
| ¼" | 1 × 4 | >1000° C. | 62° F. | 10 min | 100% Resistant |
| ¼" | 1 × 4 | >1000° C. | 62° F. | 10 min | 100% Resistant |
| ¼" | 1 × 4 | >1000° C. | 62° F. | 10 min | 100% Resistant |

*Surface temperatures were taken using an infrared thermometer.

Figure 6:
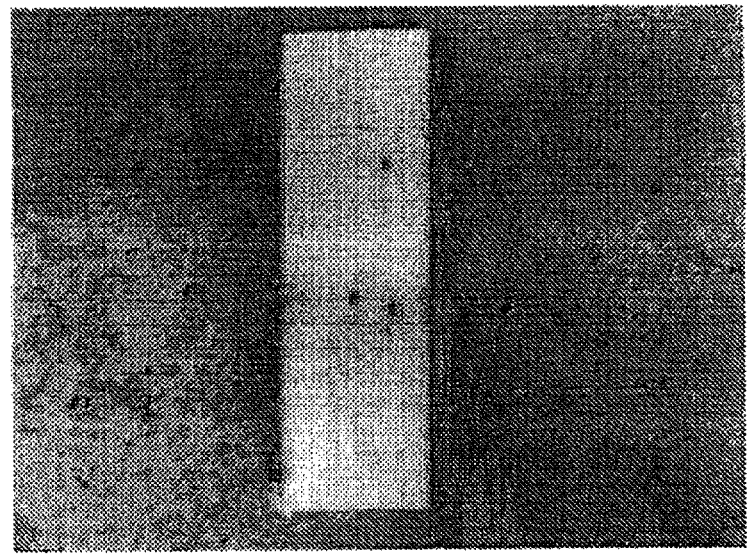
FIG. 6 is a photograph of a conventional board treated with alginate.

FIG. 6 provides a photo of a typical alginate-treated wood board as prepared by the procedure outlined above. The physical appearance of the board does not vary significantly from that of traditional lumber. However, the physical and chemical properties of alginate-treated lumber are far superior to that of the traditional matrix. First, the alginate-treated lumber was fire resistant. All attempts at initiating burning of the final wood product failed even after several hours of direct exposure of the matrix to the flame of a propane torch and to temperatures well in excess of 1000° C. In fact, when the flame of a torch was held at a distance of ¼" from the surface of the wood the only visible affect was a very small diameter hole of penetration with some blackening of a ¼" diameter region where the flame was in direct contact with the surface for several minutes to hours. Once the flame was removed not even the slightest hint of ember glow was seen. In fact one can immediately touch the heated surface finding it just slightly elevated above room temperature, still cool to the touch.

Second, alginate treated lumber exhibited greater strength to that of traditional lumber with only a negligible additional weight.

Third, alginate-treated lumber acted as an insulator. For example, when the flame of a propane torch was held at a distance of ¼" from the surface of the board for several minutes to hours the internal temperature of the board never rose above 62° F. Considering that the initial 0 hour internal temperature, the temperature prior to heating, was 61° F., alginate treated lumber had significant insulating properties and was thus resistant to the transfer of heat.

Fourth, alginate treated lumber can be specially formulated with an antifungal additive, such as an all-natural citrus extract, CitroBio™, making it resistant to mold contamination. For example, a concentration of just 160 ppm, on a dry weight bases, of citrus extract was required to inhibit mold growth. With mold resistance incorporated directly into the board matrix, a lifetime resistance has been established.

Fifth, alginate treated lumber was moisture resistant. The three-dimensional molecular matrix which was established between the alginate polymer and the wood structure through calcium cross-linking, established a molecular encapsulate which actually repels water. This too is a lifetime trait.

Sixth, in alginate treated lumber no external bonding agents were required. The calcium alginate molecular matrix encapsulate was more than sufficient for the macroencapsulation process.

Example 2

Masonry Products

The presently claimed and disclosed inventive concepts further contemplate the production and use of masonry products possessing the same properties described above for use in the construction of masonry-based structures. For example, regardless of the type of masonry construction material matrix being treated, an end product is produced which is flame retardant, heat resistant, acts as an insulator, has many times the bond strength of traditional matrixes, is resistant to moisture penetration, demonstrates flexibility and a pound per square inch(psi) strength far superior to that of traditional masonry products. Furthermore, there is virtually no limit to the masonry products which may comprise the alginate polymer component of the presently claimed and disclosed inventive concepts. For example, mortar mixes of all types and cement based products of all types, including but not limited to, the following materials and matrixes: concrete blocks of all types; coloring pigments for all types of masonry; concrete for slabs, walls, footings and roadways; concrete precast such as septic tanks and manholes; architectural precast sill, copings, features, medallions and caps; architectural cast stone for sills, copings, features; door and window surrounds, medallions, caps and water table sills, manufactured simulated stone of all kinds whether wet poured or dry pressed and whether cementious or sand based; plasters of all kinds whether cement or synthetic based; stucco of all kinds whether cement or synthetic based, brick of all types whether cement or clay based; and concrete or clay roof tile units including shale roof tile units, to name a few.

In the following procedure, the effectiveness of alginate-treated masonry products using a traditional mortar mix as our example. In the examples shown herein, the alginate mixed with the masonry material matrix is sodium alginate, which is chemically converted to calcium alginate once the aqueous sodium alginate is exposed to the calcium inherently present within the mortar mix.

Three different types of mortar mixes and one type of grout mix were tested as the material matrix. Controls were made using traditional mixing practices and assay samples were made by adding calcium sodium polymer to the same mix with the same mixing practice. Controls and assay samples were tested for workability, flame retardance, heat resistance, bond strength, water resistance, flexibility, and psi strength.

Mortar Mix Design 1: Alginate Treated
    75 lbs Mortar Standard Type S Masonry
    242 lbs of Mortar Sand ASTM 144
    5 Gallons of water
    1 Quart of Sodium Alginate Polymer 10%, or
    1 Quart of Sodium Alginate Polymer 20%

Two assay mixes were made, one with 1 quart of 10% alginate (90% water) added, and the other with 1 quart of 20% (80% water) alginate added. One control mix, without alginate, was made.

The following mixing sequences was followed:
1. Water added to mechanical mixer,
2. ½ of the sand added,
3. Alginate added,
4. 75 lbs of Mortar added,
5. Remaining sand added.

The control was mixed in the same sequence, excluding the addition of alginate. The above (except for the added alginate) is a standard mix design used industry wide with a mortar to sand ratio of 1 part mortar to 3.23 parts sand.

Discussion

Upon comparative analyses an increased ease of use or workability was experienced in the two alginate assay formulas in comparison to the control formula. The 20% alginate treated formula displayed a bond strength greater than double that of the control, both alginate treated formulas showed water resistance and keep waterproofing properties, whereas the control product (non-alginate) did not. Both alginate treated assays showed fire retardant properties in comparison to control. And finally the 20% alginate treated formula when tested in ½" slabs showed a deflection of approximately ⅛", demonstrating flexibility in the mortar as a result of alginate treatment.

Mortar Mix Design 2: Alginate Treated
  75 lbs Type S PLC Mortar (cement lime mix with no masonry additives)
  242 lbs of Mortar Sand ASTM 144
  5 Gallons of water
  1 Quart of Sodium Alginate Polymer 10%, or
  1 Quart of Sodium Alginate Polymer 20%

Two assay mixes were made, one with 1 quart of 10% alginate added, and the other with 1 quart of 20% alginate added. One control mix was made.

The following mixing sequences was used:
1. Water added to mechanical mixer,
2. ½ of the sand added,
3. PLC mortar added,
4. Remaining sand added,
5. Alginate polymer added.

The control was mixed in the same sequence excluding the addition of alginate.

Discussion

Upon comparative analyses, an increased ease of use or workability was demonstrated in the two alginate assay formulas in comparison to the control formula. The 20% alginate-treated formula displayed a bond strength greater than double that of the control, both alginate treated formulas showed water resistant and waterproofing properties, whereas the control did not. Both alginate-treated assays showed fire retardant properties in comparison to control. And finally the 20% alginate-treated formula when tested in ½" slabs showed a deflection of approximately ⅛", demonstrating flexibility in the mortar as a result of alginate treatment.

PSI Testing

Samples of all 4 mortar mix assays and the 2 mortar mix controls were tested (S & M Materials Testing Company) for 3 day, and 7 day breaks. The results were as follows:
1. 3 day break showed double compressive strength on the 10% alginate treated assays in comparison to controls.
2. 3 day break showed triple the required strength in 3 days with the 20% alginate treated samples in comparison to controls (design strength of type S PLC is 1800 psi in 28 days: alginate treated samples broke at 1760 psi in 3 day break).

The same procedural format and testing parameters as above were used to test alginate-treated and untreated mortar and grout (brand name Lacticrete™), as obtained from a local building material supplier. All testing results obtained were identical to those obtained above.

Example 3

Paint Products

A: Water- and Oil-Based Paints

The presently claimed and disclosed inventive concepts also contemplate the use of the calcium and/or sodium alginate polymer in both water-based and oil-based paint material matrices to produce heat and flame resistant indoor and outdoor paints. The addition of polymer to both water and oil based paints was again optimized to produce heat and flame resistant indoor and outdoor paints. Again we used the previous polymer formulation, Formula No. 4, for our assays here. Once the sodium alginate-paint mixture was made it was spray-atomized onto the surface of wood, drywall, metal or concrete then followed by an immediate spray mist of a calcium chloride solution (e.g., 23%) for conversion to the calcium alginate embodiment. Results of testing are shown in Tables 4-6.

TABLE 4

White Paint (Oil Base)

| | Percent of Polymer 4 Added | Amount of Polymer Added in grams | Amount of Paint Added | Amount of Torch/Burn Time >1000° C. | Assay Paint Result (Alginate-treated) | Control Paint Result (Non-alginate) |
|---|---|---|---|---|---|---|
| 1 | 0.5% | 0.25 g | 49.75 g | <60 sec. | Caught fire | Caught fire |
| 2 | 1.0% | 0.5 g | 49.5 g | <60 sec. | Caught fire | Caught fire |
| 3 | 3.0% | 1.5 g | 48.5 g | <60 sec. | Caught fire | Caught fire |
| 4 | 5.0% | 2.5 g | 47.5 g | <60 sec. | Caught fire | Caught fire |
| 5 | 7.0% | 3.5 g | 46.5 g | <60 sec. | Caught fire | Caught fire |
| 6 | 9.0% | 4.5 g | 45.5 g | <60 sec. | Caught fire | Caught fire |
| 7 | 11.0% | 5.0 g | 45.5 g | 1 hour | Fire/heat resistant; 15 minute dry time | Caught Fire |
| 8 | 13.0% | 5.91 g | 45.5 g | 1 hour | Fire/heat resistant; 15 minute dry time | Caught Fire |
| 9 | 15.0% | 6.83 g | 45.5 g | 1 hour | Fire/heat resistant; 15 minute dry time | Caught Fire |
| 10 | 17.0% | 7.74 g | 45.5 g | 1 hour | Fire/heat resistant; 10 minute dry time | Caught Fire |

TABLE 4-continued

White Paint (Oil Base)

| Percent of Polymer 4 Added | Amount of Polymer Added in grams | Amount of Paint Added | Amount of Torch/Burn Time >1000° C. | Assay Paint Result (Alginate-treated) | Control Paint Result (Non-alginate) |
|---|---|---|---|---|---|
| 11 19.0% | 8.65 g | 45.5 g | 1 hour | Fire/heat resistant; 10 minute dry time | Caught Fire |
| 12 21.0% | 9.56 g | 45.5 g | 1 hour | Fire/heat resistant; 10 minute dry time | Caught Fire |
| 13 23.0% | 10.5 g | 45.5 g | 1 hour | Fire/heat resistant; 3 minute dry time | Caught Fire |
| 14 25.0% | 11.4 g | 45.5 g | 1 hour | Fire/heat resistant; 2 minute dry time | Caught Fire |
| 15 27.0% | 12.3 g | 45.5 g | 1 hour | Fire/heat resistant; <60 second dry time | Caught Fire |
| 16 29.0% | 13.2 g | 45.5 g | 1 hour | Fire/heat resistant; <60 second dry time | Caught Fire |
| 17 31.0% | 14.11 g | 45.5 g | 1 hour | Fire/heat resistant; Instant dry | Caught Fire |

TABLE 5

White Paint (Water Base)

| Percent of Polymer 4 Added | Amount of Polymer Added in grams | Amount of Paint Added | Amount of Torch/Burn Time | Assay Paint Result (Alginate-treated) | Control Paint Result (Non-alginate) |
|---|---|---|---|---|---|
| 1 0.5% | 0.25 g | 49.75 g | <60 sec. | Caught fire | Caught fire |
| 2 1.0% | 0.5 g | 49.5 g | <60 sec. | Caught fire | Caught fire |
| 3 3.0% | 1.5 g | 48.5 g | <60 sec. | Caught fire | Caught fire |
| 4 5.0% | 2.5 g | 47.5 g | <60 sec. | Caught fire | Caught fire |
| 5 7.0% | 3.5 g | 46.5 g | <60 sec. | Caught fire | Caught fire |
| 6 9.0% | 4.5 g | 45.5 g | <60 sec. | Caught fire | Caught fire |
| 7 11.0% | 5.0 g | 45.5 g | 1 hour | Fire/heat resistant; 15 minute dry time | Caught Fire |
| 8 13.0% | 5.91 g | 45.5 g | 1 hour | Fire/heat resistant; 15 minute dry time | Caught Fire |
| 9 15.0% | 6.83 g | 45.5 g | 1 hour | Fire/heat resistant; 15 minute dry time | Caught Fire |
| 10 17.0% | 7.74 g | 45.5 g | 1 hour | Fire/heat resistant; 10 minute dry time | Caught Fire |
| 11 19.0% | 8.65 g | 45.5 g | 1 hour | Fire/heat resistant; 10 minute dry time | Caught Fire |
| 12 21.0% | 9.56 g | 45.5 g | 1 hour | Fire/heat resistant; 10 minute dry time | Caught Fire |
| 13 23.0% | 10.5 g | 45.5 g | 1 hour | Fire/heat resistant; 3 minute dry time | Caught Fire |
| 14 25.0% | 11.4 g | 45.5 g | 1 hour | Fire/heat resistant; 2 minute dry time | Caught Fire |
| 15 27.0% | 12.3 g | 45.5 g | 1 hour | Fire/heat resistant; <60 second dry time | Caught Fire |
| 16 29.0% | 13.2 g | 45.5 g | 1 hour | Fire/heat resistant; <60 second dry time | Caught Fire |

TABLE 5-continued

White Paint (Water Base)

| Percent of Polymer 4 Added | Amount of Polymer Added in grams | Amount of Paint Added | Amount of Torch/Burn Time | Assay Paint Result (Alginate-treated) | Control Paint Result (Non-alginate) |
|---|---|---|---|---|---|
| 17  31.0% | 14.11 g | 45.5 g | 1 hour | Fire/heat resistant; Instant dry | Caught Fire |

TABLE 6

Black Paint (Oil Base)

| Percent of Polymer 4 Added | Amount of Polymer Added in grams | Amount of Paint Added | Amount of Torch/Burn Time | Assay Paint Result (Alginate-treated) | Control Paint Result (Non-alginate) |
|---|---|---|---|---|---|
| 1  0.5% | 0.25 g | 49.75 g | <60 sec. | Caught fire | Caught fire |
| 2  1.0% | 0.5 g | 49.5 g | <60 sec. | Caught fire | Caught fire |
| 3  3.0% | 1.5 g | 48.5 g | <60 sec. | Caught fire | Caught fire |
| 4  5.0% | 2.5 g | 47.5 g | <60 sec. | Caught fire | Caught fire |
| 5  7.0% | 3.5 g | 46.5 g | <60 sec. | Caught fire | Caught fire |
| 6  9.0% | 4.5 g | 45.5 g | <60 sec. | Caught fire | Caught fire |
| 7  11.0% | 5.0 g | 45.5 g | 1 hour | Fire/heat resistant; 15 minute dry time | Caught Fire |
| 8  13.0% | 5.91 g | 45.5 g | 1 hour | Fire/heat resistant; 15 minute dry time | Caught Fire |
| 9  15.0% | 6.83 g | 45.5 g | 1 hour | Fire/heat resistant; 15 minute dry time | Caught Fire |
| 10  17.0% | 7.74 g | 45.5 g | 1 hour | Fire/heat resistant; 10 minute dry time | Caught Fire |
| 11  19.0% | 8.65 g | 45.5 g | 1 hour | Fire/heat resistant; 10 minute dry time | Caught Fire |
| 12  21.0% | 9.56 g | 45.5 g | 1 hour | Fire/heat resistant; 10 minute dry time | Caught Fire |
| 13  23.0% | 10.5 g | 45.5 g | 1 hour | Fire/heat resistant; 3 minute dry time | Caught Fire |
| 14  25.0% | 11.4 g | 45.5 g | 1 hour | Fire/heat resistant; 2 minute dry time | Caught Fire |
| 15  27.0% | 12.3 g | 45.5 g | 1 hour | Fire/heat resistant; <60 second dry time | Caught Fire |
| 16  29.0% | 13.2 g | 45.5 g | 1 hour | Fire/heat resistant; <60 second dry time | Caught Fire |
| 17  31.0% | 14.11 g | 45.5 g | 1 hour | Fire/heat resistant; Instant dry | Caught Fire |

B: All-Natural Component Paint

Another embodiment of the presently claimed and disclosed inventive concepts revolutionizes the paint industry by totally reformulating paints into an all-natural "environmentally-friendly" material matrix. For example, currently the industry has two primary classes of paint, "water-based" and "oil-based". Both are formulated using chemicals which are known carcinogens, flammable and toxic upon ingestion by mammals. We've all painted a room at some point in our life and have experienced first hand the potentially harmful vapors emitted throughout the course of painting practice and matrix drying. In fact the fumes linger for days. Imagine a paint made of 100% non-toxic all-natural components in the absence of solvent additives which emit harmful vapors, that is, a "no-scent" paint. The present invention contemplates a non-toxic paint which is formulated with all-natural pigments from nature (e.g. lycopene, astaxanthin, lutein, beta-carotene, chlorophyll and any other carotenoid or anthocyanin pigment) providing a color vibrancy many times that of traditional paints with magnitudes less pigment. In addition, this paint is 100% flame retardant, acts as an insulator, is moisture resistant, mold resistant, has many times the bond strength of traditional paint, possesses an instant dry characteristic, has a 5 year shelf-life without pigment separation (no stirring needed after initial mix), has a lifetime pigment viability, is chip and peel resistant, possesses flexibility and can be used to paint any surface type whether indoor or outdoor. The following experiments show how such a paint may be formulated in a non-limiting embodiment.

Procedure: All-Natural "InstaDry" Flame Resistant Paint

A 3% alginate base is prepared by homogenizing the polymer in water (cold or at room temperature) until a homogeneous gel is obtained. Next, to 225 ml of 3% alginate base, is added 500 mg of beta-carotene and 500 mg of carmine. This makes a classic red paint. Homogenize the mixture to a homogeneous gel and apply to, e.g., wood, drywall, metal and/or concrete surfaces. After laying down the paint coating, mist spray the surface with an aqueous calcium chloride solution (e.g., 5%-30%, preferably 23%). Immediately wipe away the mist from the surface with a dry rag and conduct testing for the parameters specified above.

Discussion

Any natural pigment may be used alone or in any combination with other pigments to obtain a wide array of color spectra. After testing the paint, in comparison to a Valspar classic red water base paint control, the novel paint of the invention was found to possess the following properties:

1. All-Natural Base (water/alginate).
2. All-Natural Pigments.
3. More vibrant color with less pigment.
4. No pigment separation upon storage.
5. No carcinogenic additives.
6. No solvent presence.
7. No scent.
8. No vapor immersion.
9. Instant drying.
10. Fire resistance.
11. Heat resistance.
12. Acts as insulator.
13. Double bond strength.
14. Lifetime color vibrancy.
15. Chip, peel resistant.
16. Water/moisture resistance.
17. Mold resistance.
18. Can be used to paint any surface indoor or outdoor.
19. Flexibility.

Example 4

Use of Alginate Gel as a Fire-Break Polymer

In another embodiment of the presently claimed and disclosed inventive concepts, a wet "fire-break" polymer gel was prepared by homogenizing sodium alginate (e.g., 252 gm) in cold water to a get state. This gel is profound in its ability to stop wildfires and in forming a fire-break perimeter. For example, 10 Kg of grass was soaked in gasoline and then laid out in a thick layer. Next a fine mist of alginate polymer gel was spray atomized in a straight line across the center of the gas soaked layer of grass. All the grass burned completely except for the portion sprayed with the alginate polymer, which did not burn at all, leaving the green grass untouched. The same test was performed on cedar trees and leaves with identical results. In addition a towel was soaked in gasoline and an image painted on it using the sodium alginate polymer. The entire rag burned completely except for the image portion, which was completely unaffected by the fire. The image portion of the towel appeared just as it did prior to lighting the towel.

In conclusion, in preferred embodiments, the presently disclosed and claimed inventive concepts are directed to building material products for use in construction which comprise a construction material matrix component, and an alginate polymer component dispersed on or within the construction material matrix component. The alginate polymer component of the building material product may comprise for example sodium alginate and/or calcium alginate. The alginate polymer component of the building material product may further comprise a cross-linking agent which may be, for example, at least one of a xanthan gum, a carrageenan, and an agar. The alginate polymer component of the building material product may further comprise an anti-mold or anti-fungal agent. The alginate polymer component of the building material product may comprise, for example, 1% to 25% by weight of the building material product. The building material product may comprise, for example, a wood product, a masonry product, a paint product, a siding product, a flooring product, or a roofing product. The presently disclosed and claimed inventive concepts are also directed to a building or building component and/or fence or fence component comprising a building material product described herein.

Additionally, in preferred embodiments, the presently disclosed and claimed inventive concepts are directed to methods of producing a building material product, comprising the steps of providing a construction material matrix component, providing an alginate polymer component, combining the construction material matrix component and the alginate polymer component, and processing the combined construction material matrix component and alginate polymer component to form the building material product. As noted, the alginate polymer component may comprise sodium alginate and/or calcium alginate. The alginate polymer component may further comprise a cross-linking agent. The cross-linking agent may be at least one of a xanthan gum, a carrageenan, and an agar. The alginate polymer component may further comprise an anti-mold or anti-fungal agent. The alginate polymer component may comprise, for example, 1% to 25% by weight of the final building material product. The building material product produced by the method may be, for example, at least one of a wood product, a masonry product, a paint product, a siding product, a flooring product, and a roofing product.

The presently claimed and disclosed inventive concepts are not to be limited in scope by the specific embodiments described herein, since such embodiments are intended as but single illustrations of various aspects of these presently claimed and disclosed inventive concepts and any functionally equivalent embodiments are within the scope of these presently claimed and disclosed inventive concepts. Indeed, various modifications of the methods of the presently claimed and disclosed inventive concepts in addition to those shown and described herein will become apparent to those skilled in the art from the foregoing description.

Each of the references, patents or publications cited herein is incorporated by reference in its entirety.

What is claimed is:

1. A building material product for use in construction that is resistant or impervious to fire, flame, or heat, said product comprising:

a construction material matrix component selected from the group consisting of saw dust, stranded wood, wood chips, and mixtures thereof; and an alginate polymer component comprising calcium alginate dispersed on or within the construction material matrix component, said product comprising from 0.5 to 25% by weight of the alginate polymer component, based upon the total combined weight of the construction material matrix component and alginate polymer component taken as 100% by weight, wherein said alginate polymer component confers flame-, fire-, or heat-resistance or impervenousness to said building material product, wherein said building material product is a pressed board.

2. The building material product of claim 1, wherein the alginate polymer component further comprises a cross-linking agent.

3. The building material product of claim 2, wherein the cross-linking agent is at least one of a xanthan gum, a carrageenan, an agar, a cellulose gum, a pectin, a pectin resin, a locust bean gum, a locust bean resin, a xanthan gum resin, a sodium salt of carrageenan, a gellan gum, a gellan gum resin, a whey protein gum, a whey protein resin, a propylene glycol, an Arabic gum, an Arabic gum resin, a guar gum, a guar gum resin, a gum tragacanth, or a gum ghatti.

4. The building material product of claim 1, wherein said building material product further comprises an anti-mold or anti-fungal agent.

5. The building material product of claim 1, wherein the pressed board contains no external adhesives or bonding agents.

6. The building material product of claim 1, wherein the product is resistant to catching fire when the flame of a torch having a temperature of about 1000° C. is held to the surface of the product for between 10 to 60 minutes.

7. A method of producing a building material product resistant or impervious to fire, flame, or heat, said method comprising:

providing a construction material matrix component selected from the group consisting of saw dust, stranded wood, wood chips, and mixtures thereof;

providing an alginate polymer component comprising calcium alginate;

combining the construction material matrix component and the alginate polymer component; and processing the combined construction material matrix component and alginate polymer component to form the building material product, wherein said processing comprises pressing the combined construction material matrix component and alginate polymer component into a pressed board, wherein the building material product comprises 0.5% to 25% by weight alginate polymer component based upon the total weight of the combined construction material matrix component and alginate polymer component taken as 100% by weight, and wherein said alginate polymer component confers flame-, fire- or heat-resistance or impervenousness to said building material product.

8. The method of claim 7, wherein said pressed board contains no external adhesives or bonding agents.

9. A method of producing a building material product resistant or impervious to fire, flame, or heat, said method comprising:

providing a construction material matrix component that is a mixture of sand, water, and masonry mortar;

providing an alginate polymer component comprising calcium alginate;

combining the construction material matrix component and the alginate polymer component; and processing the combined construction material matrix component and alginate polymer component to form the building material product, wherein the building product is a masonry product, and wherein the building material product comprises 0.5% to 25% by weight alginate polymer component based upon the total weight of the combined construction material matrix component and alginate polymer component taken as 100% by weight, and wherein said alginate polymer component confers flame-, fire- or heat-resistance or impervenousness to said building material product.

10. The method of claim 9, wherein said masonry product is flexible and when formed into a ½-inch thick slab shows a deflection of approximately ⅛-inch.

* * * * *